United States Patent [19]

Oishi et al.

[11] Patent Number: 4,812,832

[45] Date of Patent: Mar. 14, 1989

[54] INPUT CONTROL DEVICE

[75] Inventors: Minoru Oishi; Yoshinari Morimoto; Akihiro Furukawa; Tomoko Miura; Yoshie Ikeda; Akemi Nagatsuna, all of Nagoya, Japan

[73] Assignee: Brother Kogyo Kabushiki Kaisha, Japan

[21] Appl. No.: 73,730

[22] Filed: Jul. 15, 1987

[30] Foreign Application Priority Data

Jul. 15, 1986 [JP] Japan .................................. 61-166272

[51] Int. Cl.[4] ............................................. B41J 3/46
[52] U.S. Cl. .................................... 340/709; 340/706; 340/711; 400/83
[58] Field of Search ................... 340/709, 711, 706; 364/518, 521; 400/83

[56] References Cited

U.S. PATENT DOCUMENTS

| 3,648,249 | 3/1972 | Goldsberry | 340/709 |
|---|---|---|---|
| 4,445,194 | 4/1984 | Cason et al. | 340/709 |
| 4,497,589 | 2/1985 | Figini | 400/83 |
| 4,624,587 | 11/1986 | Ueno et al. | 340/709 |

Primary Examiner—John W. Caldwell, Sr.
Assistant Examiner—Alvin Oberley
Attorney, Agent, or Firm—Kane, Dalsimer, Sullivan Kurucz, Levy, Eisele and Richard

[57] ABSTRACT

In an input control device for use with an electric typewriter, word processor or computer, provided are a special back key which inputs the command for moving a visual indicator in a direction toward the beginning of a line of data, and a special advance key which inputs the command for moving the indicator in a direction toward the end of the line. With the special back key depressed, the indicator is moved to the beginning of the line when the indicator is within a data string and to the end of data string when the indicator is outside the data string. With the special advance key depressed, the indicator is moved to the end of the data string when the indicator is positioned within the data string except at the end of the data string and to the end of the line when the indicator is outside the data string except at the end of the data string.

9 Claims, 2 Drawing Sheets

INPUT CONTROL DEVICE

BACKGROUND OF THE INVENTION

This invention relates to an input control device for use with an electronic typewriter, word processor or computer, and more particularly to an input control device which is able to simply and conveniently control the movement of the indicator for data display position or data printing position.

Electronic typewriters and word processors and computers are generally provided with keys which serve to move the indicator (printer head or cursor) to an arbitrary position. Depressing these keys causes the indicator to move up and down, right and left, in a step by step, word by word, or continuous manner.

When, however, one wants to move the indicator to the end of data string created on the line or the beginning or end of the line to add characters to the text already prepared or to expand the left or right margin, one has to depress multiple times or keep depressing the key for a desired movement. If the key is released at a wrong time, the indicator cannot be stopped at a desired position so that one has to again move the indicator forward or backward step by step. This made the operation generally complicated.

SUMMARY OF THE INVENTION

It is therefore an object of the invention to provide an improved input control device which allows the indicator to move to the beginning or end of the line or the end of a data string already created with a simple key operation.

For this purpose, according to the invention, there is provided an input control device which specifies a data input position by moving an indicator 2 forward or backward between the beginning and end of a line on a visible display medium 1, as shown in FIG. 1, comprises a special back key 3 which inputs the command for moving the indicator 2 toward the beginning of line; a special advance key 4 which inputs the command for moving the indicator 2 toward the end of line; position detecting means 5 which detects the position of the indicator 2 when one of the keys 3, 4 is depressed; special back-movement control means 6 which, with the special back key 3 depressed, moves the indicator 2 to the beginning of line according to the output of the position detecting means 5 which indicates that the indicator 2 is within the data string, while moving the indicator 2 to the end of the data string if it is outside the data string; and special advance-movement control means 7 which, with the special advance key 4 depressed, moves the indicator 2 to the end of the data string according to the output of the position detecting means 5 which indicates that the indicator 2 is within the data string, while moving the indicator 2 to the end of line if it is outside the data string.

Meanwhile, "data string" includes a data space next to the last data thereof created on the line.

Consequently, the indicator 2 can be moved to the beginning of the line or the end of the data string simply by depressing the special back key 3, while it can be moved to the end of the line or end of the data string simply by depressing the special advance key 4. This allows for a simple and quick movement of the indicator 2 to the end of text, beginning or end of the line, when, for instance, one wishes to add characters to the end of data string already created or to expand the right or left margin.

DESCRIPTION OF THE ACCOMPANYING DRAWINGS

FIGS. 2 to 4 show an embodiment of the invention, of which FIG. 2 is a block diagram of a word processor embodying the invention, FIG. 3 is a flow chart for processing special cursor movement and FIG. 4 is an illustration of a display screen.

DESCRIPTION OF THE PREFERRED EMBODIMENT

The preferred embodiment of the invention is described with reference to the accompanying drawings.

Figure 1:
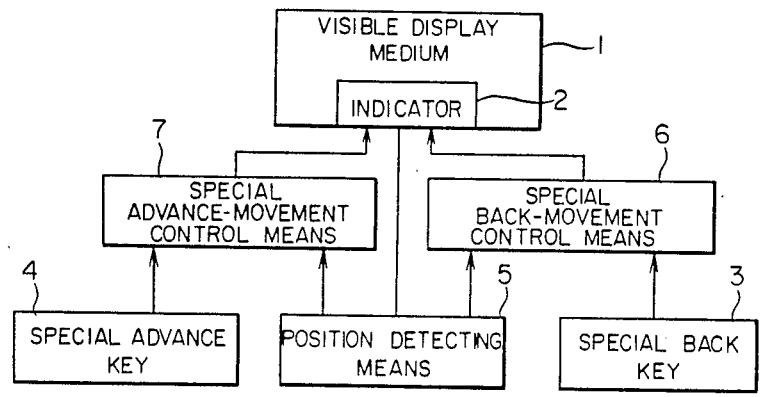
FIG. 1 is a general structural view of the present invention.
Figure 2:
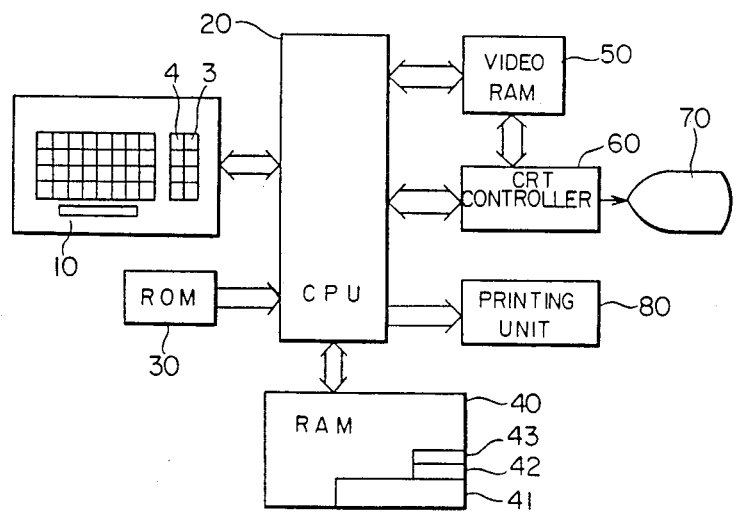

FIG. 2 shows the block diagram of a work processor which includes the input control device embodying the invention.

A keyboard 10 is provided with character keys such as alpha and numeric keys, a cluster of function keys, and cursor move keys which includes, in addition to ordinary up and down, right and left keys and a tab key, a special back key 3 and a special advance key 4. These special back and advance keys 3 and 4 serve to move a cursor displayed on a CRT (Cathode-Ray Tube) 70 to the beginning or end of the current line, or to the end of the already created data string, as will be further described. During the key operation, the key code corresponding to each keystroke is sent from the keyboard 10 to a CPU (Central Processing Unit) 20.

The CPU 20 executes operations required for processing input and output character data and similar data and editing and other processings, in accordance with program data stored in a ROM (Read Only Memory) 30. The special movement of the cursor to be described later is also processed by the CPU 20. CPU 20, ROM 30, RAM (Random Access Memory) 40, video RAM 50, CRT controller 60 and printer unit 80 are all interconnected via a common bus to transfer control signals, data signals and address signals to one another.

RAM 40 contains a text memory 41 into which data such as characters and symbols are input through the keyboard 11, a cursor pointer 42 which stores the cursor position (number of lines, number of strings) and an end-of-text pointer 43 which retains data indicating the end position of the data string created on the line on which the cursor is positioned. The cursor pointer 42 and the end-of-text pointer 43 retains the address of the cursor or the end of text which is stored in the video RAM 50. In the data of the data string, included are space data, tab data and so on besides character data.

The video RAM 50 is a display buffer which temporarily stores the data for one screen of the CRT 70, with its memory address corresponding to the display address on the display screen of the CRT 70 in an exact address-to-address relationship. The CRT controller 60, including a character generator retaining the character font (character pattern), renders the CRT 70 to display characters or the like and is connected to the video RAM 50 as well.

The data (character code) input through the keyboard 10 is stored in the text memory 41 through CPU 20, while also being stored in the specified address of the video RAM 50. The CRT controller 60 immediately reads out the input data from the video RAM 50 and operates the character generator to bring a particular character font corresponding to the data into display on the CRT 70.

The printing unit 80 has a printing head, not shown, horizontally movable in accordance with printer-head moving signals sent from the CPU 20 depending upon the character spacing. It is possible to use, as the printing unit, thermal printer, wire-dot printer and typewheel printer.

Figure 3:
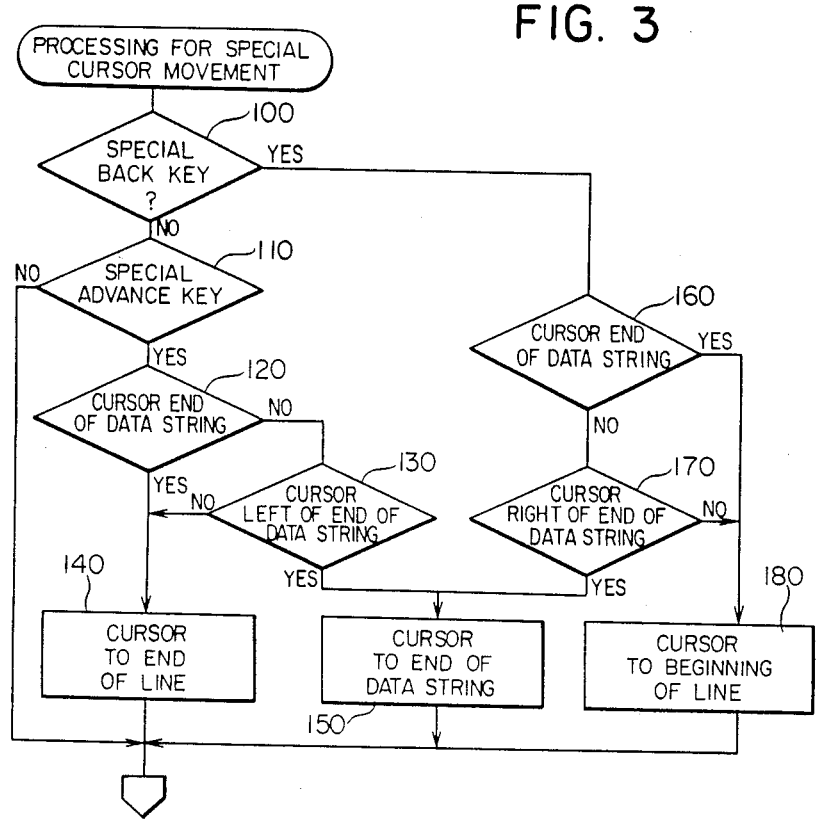

The operation of the special cursor movement in the word processor constructed as above is not described with reference to the flow chart of FIG. 3 and the screen display illustration in FIG. 4.

Figure 4:
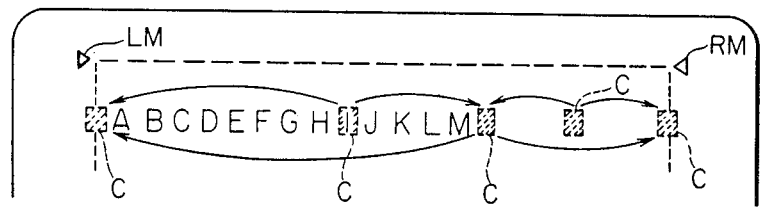

Assume there is a data string (e.g. a character string from A to M including a data space next to M) entered to a certain line within the text area, as shown in FIG. 4. When, with the cursor C within the string, the special back or advance key 3 or 4 is depressed to give a cursor command, the CPU 20 processes for the special cursor movement as shown in FIG. 3 in part of its main routine or subroutine to move the cursor C to the beginning or end of the line or to the end of the data string in dependence on the current position of the cursor C.

Once this routine is entered, the step 100 is first executed to determine whether the key depressed is the special back key 3 or not. If it is found to be the key 3, the execution goes to the step 160. This step examines if the current position of the cursor C is at the end of the data string. If it is currently at the end of the data string, the step 180 is entered and the cursor C is moved to the beginning of the line, that is, on the column of the left margin mark LM. If the cursor C is positioned to the left of the end of the string, the step advances from 160 to 170 to examine if the cursor C is to the right of the end of the string. The step 180 is then entered to move the cursor C to the beginning of the line. The step 170 may be, of course, carried out likely as the step 130, and vise versa.

Thus, when the special back key 3 is depressed with the cursor C within the string, the cursor C immediately moves to the beginning of the line, that is, to the column of the left margin mark LM. This makes cursor movement so easy when, for instance, expanding the left margin.

If, on the other hand, the special back key 3 is depressed with the cursor C positioned in a blank in the right of the end of the string, the execution goes through the step 160, step 170 to the step 150 to move the cursor C to the end of the string.

Thus, when the special back key 3 is depressed with the cursor C within the blank to the right of the end of the string, the cursor C immediately moves to the end of the string. This makes cursor movement easy when, for instance, adding characters to the line.

When the special advance key 4 is depressed, the step goes from 100 to 110 to examine whether the depressed key is the special advance key 4 or not to allow the step to advance to 120. If in this step the cursor C is found to be at the end of the string, the step 140 is reached to move the cursor C to the end of the line, that is, on the column of the right margin mark RM. If on the other hand, the cursor C is in a blank to the right of the end of the string, the step goes from 120 to 130. The latter step detects the cursor positioned to the left of the end of the string to allow the step to advance to 140 where the cursor C is moved to the end of the line.

Thus, when the special advance key 4 is depressed with the cursor C positioned at the end of the string entered or in a blank in the right of the string, the cursor C immediately moves to the end of the line, that is, to the column of the right margin mark RM. This makes cursor movement easy when, for instance, expanding the right margin.

If, on the other hand, the special advance key 4 is depressed with the cursor C positioned in the left of the end of the string, the execution goes through the steps 120 and 130 to the step 150 to move the cursor C to the end of string.

Thus, when the special advance key 4 is depressed with the cursor C positioned to the left of the end of the string, the cursor C is immediately moved to the end of the string. This makes cursor movement so easy when, for instance, adding characters to the line.

After the steps 140, 150, 180 have been executed to move the cursor C or when the step 110 has determined the special advance key 4 is not depressed, this routine is escaped to transfer to other processing.

As apparent from above, when the cursor C is positioned to the left of the end of the string, depressing the special advance key 4 causes the steps 100 to 130 and 150 to run, moving the cursor C to the end of the string, while another depressing the special advance key 4 causes the steps 100 to 120 and 140 to run, moving the cursor C to the end of the line. Thus, the simple two strokes of the same key enable the cursor C to be brought to the end of the line.

Likewise, when the cursor C is positioned in a blank in the right of the end of the string, depressing the special back key 3 causes the steps 100, 160, 170 and 150 to run, moving the cursor C to the end of the string, while another depressing the special back key 3 causes the steps 100 and 160 to 180 to run, moving the cursor C to the beginning of the line. Thus, the simple two strokes of the same key enable the cursor C to be brought to the beginning of the line.

Although the description above refers to the embodiment incorporating the word processor with the CRT as display unit, this invention is applicable to the typewriter with an LED or the like display or the one without display. In the latter, because there is no cursor, the printer head movable to print data on the print paper serves as the indicator.

This invention can also be applied, of course, to the input device of computers.

As described above, the input control device according to the invention comprises a special back key which inputs the command for moving the indicator toward the beginning of a line and a special advance key which inputs the commands for moving the indicator toward the end of the line, so that when the indicator is positioned within the data string, it is moved to the beginning of the line by pressing the special back key and the indicator is moved to the end of a data string by pressing the special advance key, while when the indicator is outside the data string, it is moved to the end of the data string by depressing the special back key and the indicator is moved to the end of line by depressing the special advance key. Accordingly, when, for instance, adding data to the end of data string already entered, the indicator can be easily moved to the end of the data string by operating the special back or advance key, so long as the indicator is along the line, providing a quick and easy input operation. Also, when expanding the left or right margin of the screen or entering corrections around the beginning or end of the line, the indicator can be directly moved to the beginning or end of the line by operating the special back or advance key, providing a quick and easy input operation.

What is claimed is:

1. In an input control device which, for data entry along a line having a beginning and an end, specifies a data input position by moving a visual indicator forward or backward between the beginning and end of the line, the improvement which comprises;
   a special back key which inputs a command for moving said indicator in a direction toward said beginning of the line;
   a special advance key which inputs a command for moving said indicator in a direction toward said end of the line;
   position detecting means for detecting the position of said indicator when one of said keys is depressed;
   means responsive to said position detecting means for moving said indicator, in response to a single pressing of said special back key, to said beginning of the line when said indicator is within a data string, said data string including a data space next to the last data thereof, while to end of said data string when the indicator is outside said data string; and
   means responsive to said position detecting means for moving said indicator, with said special advance key once depressed, to (1) said end of data string when said indicator is positioned within said data string except at the end of said data string, and (2) to said end of line when the indicator is outside said data string or at said end of data string.

2. The device according to claim 1 wherein said indicator is a cursor displayed on a screen of a display device.

3. The device according to claim 1 wherein said indicator is a printing head of a printing device.

4. In an input control device which, for data entry, along a line having a beginning and an end, specifies a data input position by moving a visual indicator forward or backward between the beginning and end of the line, the improvement which comprises;
   a special back way which inputs a command for moving said indicator in a direction toward said beginning of the line;
   a special advance key which inputs a command for moving said indicator in a direction toward said end of the line;
   first means for determining whether said indicator is positioned at the end of a data string created on said line, said data string including a data space next to the last data thereof;
   second means for determining if said indicator is positioned within said data string;
   means responsive to said first and second determining means for moving said indicator, in response to a single pressing of said special back key, to said beginning of the line when said indicator is within a data string including a data space next to the last data thereof and to the end of said data string when the indicator is outside said data string; and
   means responsive to said first and second determining means for moving said indicator, with said special advance key once depressed, to said end of data string when said indicator is positioned within said data string except said end of data string, while to said end of line when the indicator is outside said data string except said end of data string.

5. The device according to claim 4 wherein said second means determines if said indicator is positioned at the left side of said end of the data string if said indicator is not on the end of the data string.

6. The device according to claim 4 wherein said second means determines if said indicator is positioned at the right side of the end of the data string if said indicator is not on said end of the data string.

7. The device according to claim 4 wherein said indicator is a cursor displayed on a screen of a display device.

8. The device according to claim 4 wherein said indicator is a printing head of a printing device.

9. In input control device which, for data entry, specifies a data input position by moving a visual indicator forward or backward between the beginning and end of a line, the improvement which comprises:
   a special back key which inputs a command for moving said indicator in a direction toward said beginning of line;
   a special advance key which inputs a command for moving said indicator in a direction toward said end of line;
   key detecting means for detecting which of said special keys operated;
   position detecting means for detecting the present position of said indicator when one of said special keys is operated;
   means responsive to said key detecting means and position detecting means for moving said indicator, with said special back key once depressed, to said beginning of line when said indicator is within a data string including a data space next to the last data thereof, while to end of said data string when the indicator is outside said data string; and
   means responsive to said key detecting means and position detecting means for moving said indicator, with said special advance key once depressed, to said end of data string when said indicator is within said data string except when the indicator is outside said data string and at said end of data string.

* * * * *